United States Patent
Kitahori et al.

(10) Patent No.: US 6,881,920 B2
(45) Date of Patent: Apr. 19, 2005

(54) WELDING PARAMETERS SETTING METHOD FOR A RESISTANCE WELDER CONTROLL APPARATUS

(75) Inventors: Reiji Kitahori, Kawasaki (JP); Mitsuyasu Hirose, Kawasaki (JP)

(73) Assignee: Dengensha Manufacturing Company Limited, Kanagawa (JP)

( * ) Notice: Subject to any disclaimer, the term of this patent is extended or adjusted under 35 U.S.C. 154(b) by 147 days.

(21) Appl. No.: 10/441,260

(22) Filed: May 20, 2003

(65) Prior Publication Data

US 2004/0007562 A1 Jan. 15, 2004

(30) Foreign Application Priority Data

| May 20, 2002 | (JP) | 2002-144342 |
| Jul. 23, 2002 | (JP) | 2002-213616 |
| Jul. 23, 2002 | (JP) | 2002-213899 |

(51) Int. Cl.$^7$ .................................. B23K 11/10
(52) U.S. Cl. ................ 219/86.7; 219/108; 901/42
(58) Field of Search .............. 219/86.7, 86.25, 219/117.1, 108, 110

(56) References Cited

U.S. PATENT DOCUMENTS

| 4,717,805 A | * | 1/1988 | Miyagawa ............... 219/108 |
| 5,079,491 A | | 1/1992 | Nose et al. |
| 5,229,567 A | | 7/1993 | Kobayashi et al. |
| 5,484,975 A | | 1/1996 | Itatsu |
| 5,714,733 A | * | 2/1998 | Moro ....................... 219/108 |
| 6,066,824 A | | 5/2000 | Crawford et al. |

FOREIGN PATENT DOCUMENTS

| JP | 07-144283 A | 6/1997 |
| JP | 10-058157 A | 3/1998 |

OTHER PUBLICATIONS

Patent Abstract of Japan, abstracting 01154206A, Publication Date Sep. 20, 1989, vol. 013, No. 422, p. 933.
Patent Abstract of Japan, abstracting 10128693A, Publication Date Aug. 31, 1998, vol. 1998, No. 10.
Patent Abstract of Japan, abstracting 02219162A, Publication Date Nov. 19, 1990, vol. 014, No. 525, p. 1132.
Patent Abstract of Japan, abstracting 11259422A, Publication Date Dec. 22, 1999, vol. 1999, No. 14.
Japanese Abstract No. 05220580, dated Aug. 31, 1993.

* cited by examiner

Primary Examiner—Clifford C. Shaw
(74) Attorney, Agent, or Firm—Sughrue Mion, PLLC

(57) ABSTRACT

A robot controller and a welding timer coupled to each other by a dual-port RAM which is connected to data busses thereof, and Initial reference values of welding parameters are stored into a ROM of welding timer in same sequence as character strings of items. When power is turned on, character strings of items and values of the parameters are stored into a RAM of a robot, and both are displayed on a teaching pendant in same sequence. In teaching pendant, values of welding parameters are arbitrarily changed, and then stored into RAM of robot, and also into a RAM of the welding timer via dual-port RAM. A weld command given from the robot to welding timer via dual-port RAM, welding timer performs a welding process on basis of welding parameters which have been edited by teaching pendant and stored in RAM of the welding timer.

5 Claims, 15 Drawing Sheets

WELDING PARAMETERS SETTING METHOD FOR A RESISTANCE WELDER CONTROLL APPARATUS

BACKGROUND OF THE INVENTION

1. Field of the Invention

The present invention relates to a method of setting welding parameters in an integrated control system in which a robot controller for controlling an operation of a robot, and a welding controller including a timer and a contactor for controlling the welding current and the welding time (hereinafter, such a controller is referred to as a welding timer) are integrated with each other, and which, through a teaching pendant, centrally manages welding parameters and other processes such as teaching of the robot, reading and writing of input and output data, and monitoring.

2. Description of the Related Art

A robot controller for a resistance spot welder and a welding timer are conventionally integrated with each other in a control system. For example, a control method disclosed in JP-A 7-144283 and that disclosed in JP-A 10-58157 are known as the control system.

In the former method, a servomotor as a driving source is used in a pressure actuator, which is used for an electrode of a spot welder. The pressure actuator starts a pressurizing operation in response to a weld start signal supplied from a robot controller. Then, the robot controller controls a robot to move in response to a weld completion signal supplied form a controller for the pressure actuator.

During the welding time from an electrode pressurization to an electrode opening in the spot welder, a force of pressurizing the electrode is synchronized with the welding current. The force of pressurizing the electrode is controlled by the controller for the pressured actuator. The welding current is controlled by a welding timer for controlling a switch of a welding source.

In the latter method, a spot welding timer and a pressurizing force controller are connected to each other via a system bus. The spot welding timer and the pressurizing force controller are synchronizingly controlled by a robot controller. In accordance with stored welding data, the robot controller synchronizingly changes in plural steps both the pressurizing force and the welding current.

In teaching of welding sequence data by the above-described control method, a control method is known as shown in FIGS. 1 and 2. Both a welding timer and a robot controller are connected to each other by a field bus. The welding sequence data are set into the welding timer via the field bus by a teaching apparatus which is connected to the robot controller.

In this case, the following system is usually employed (see JP-A 2001-58275). A setting screen depends on a program of a robot side. For example, setting items such as "squeeze (cycle)", "slope (cycle)", "energization 1 (cycle)", and "current 1 (amp)", and the sequence of "1", "2", "3", "n" are set to a fixed format when the program is prepared.

A welding controller transmits values of the welding parameters "30", "3", "10", "8000". Each time when the welding parameters are added or changed due to modification of the specification of the welding controller, both the editing screen (item names and arrangement sequence) for the welding parameters of the robot side and the screen format must be changed. As a result, software must inevitably be modified so that the cost is increased.

Conventionally, a robot controller and a welding timer usually communicate with each other via an I/O unit or an interface based on serial communication as shown in, for example, FIG. 3. The robot controller operates a resistance spot welder and controls pressurization of electrode tips of the welder. The welding timer performs a welding control- such as a welding time and a welding current.

In the configuration shown in FIG. 3, when welding is to be started, the robot controller gives a weld command to the welding time at the same time the robot controller pressurizes and drives the electrode tips at a predetermined pressurizing force set in the robot controller; The welding timer, which receives the weld command from the robot controller, performs a welding control; and, after welding is ended, a welding ending signal is issued to the robot controller.

In the robot controller, a pressurization control method is employed in which the electrode pressurizing force is maintained to a constant level during a period from the start of the pressurization to a timing when the welding ending signal is received.

In this case, such a resistance spot welder pressurizes and drives the electrode tips while converting rotational motion into linear motion under an electronic control by a microcomputer, by a mechanical drive unit such as a screw nut and a ball screw, a reduction gear, a rack and a pinion, or a cam. According to the configuration, a torque for a pressurizing force required for welding is generated between the electrode tips to squeeze welded articles. Then, a predetermined current is supplied to the electrode tips via a welding transformer connected to the welder, thereby performing spot welding. Such a welder is operated by a robot controller to be used in a process of assembling the body of an automobile, etc. Usually, spot welding guns of the C type or the X type are used.

In the above paragraph, although it is not usual to variably pressurize the electrode tips during a welding process, variable pressurization during a welding process can be performed by using a time counter incorporated in the robot controller. For example, a method may be contemplated in which an arbitrary electrode pressurizing force and an arbitrary pressurizing force changing timing are set in the robot controller. When welding is to be started, the robot controller pressurizes and drives the electrode tips and gives a weld command to the welding timer, and the welding timer performs a welding control. After a predetermined time is counted by the time counter, the robot controller changes the pressurizing force of the electrode tips to a predetermined value.

In this method, the electrode pressurizing force during a welding process is managed by the robot controller, and therefore it is impossible to variably pressurize the electrode tips in synchronization with the welding timer.

In the related art, the robot controller conventionally maintains a waiting state in the system until the welding control is ended by the welding timer. However, variable pressurization during a welding process can be performed by using a time counter incorporated in the robot controller.

For example, an arbitrary electrode pressurizing force and an arbitrary pressurizing force changing timing are set in the robot controller. When welding is to be started, the robot controller pressurizes and drives the electrode tips and gives a weld command to the welding timer, and the welding timer performs a welding control in accordance with a preset welding time. By contrast, a method may be contemplated in which, after a predetermined time is counted by the time counter, the robot controller changes the pressurizing force of the electrode tips to a predetermined value.

In this method, the pressurizing force changing timing during a welding process is managed by the robot controller, and the welding time is managed by the welding timer. Therefore, the pressurization control performed by the robot controller cannot be synchronized with the welding control performed by the welding timer, with the result that it is impossible to perform a variable pressurization control on the electrode pressurizing force.

SUMMARY OF THE INVENTION

It is a purpose of the invention to provide a method of setting welding parameters of a controller for a resistance welder.

In the first aspect of the invention, a welding parameters setting method for resistance welder control apparatus, the method comprising the steps of:

connecting to data busses of both a robot controller and a welding timer via dual-port RAM; storing, in ROM of welding timer, character strings of items of welding parameters for displaying on a teaching pendant of a robot and initial reference values of said welding parameters in a same sequence and in corresponding manner; initially connecting said robot and said welding timer to each other; transferring said character strings of items and standard parameters from said welding timer to said robot to be stored in RAM of said robot when power source is turned on; displaying, on said teaching pendant, said character strings of items of said welding parameters and welding parameters values in same sequence and in a corresponding manner; arbitrarily changing, in said teaching pendant of said robot, said welding parameters values of any schedule in accordance with welding conditions of a welded article to which said schedule is to be applied; storing, in said RAM of said robot, said welding parameters values of any schedule; transferring said welding parameters values of any schedule to a RAM of said welding timer to be stored thereinto via dual-port RAM; and transferring, a weld command from said robot to said welding timer via said dual-port RAM so that said welding timer performs a welding process based on said welding parameters which have been edited by said teaching pendant of said robot and which are stored in said RAM of said welding timer.

In the second aspect of the invention, which is characterized in that a welding parameters setting method for resistance welder control apparatus, the method comprising the steps of: squeezing welded article between a pair of electrode tips; supplying a current to said welded article while applying a pressurizing force onto said electrode tips; controlling said pressurization of said electrode tips by a robot controller; controlling a welding time and welding current by a welding timer; editing welding parameters including an arbitrary welding time and an arbitrary welding current and parameters including arbitrary electrode pressurizing force through a teaching pendant of said robot controller, so that said edited data are stored into a RAM of said welding timer; driving said electrode tips with said electrode pressurizing force by said robot controller when welding is to be started, giving a weld command to said welding timer by said robot controller; starting to control said welding timer and welding current by said welding timer; instructing, by said welding timer, change of said pressurizing force to said robot controller at predetermined time; changing, by said robot controller, said pressurizing to a predetermined value in response to said instruction.

According to the second aspect of the invention, arbitrary welding parameters and an electrode pressurizing force are edited by the teaching pendant of the robot controller, the edited data are stored into the robot controller, and, at a given timing of changing the welding current during a pressurizing process, the robot controller instructs the welding timer on the value of the welding current.

In the third aspect of the invention, a welding parameters setting method for resistance welder control apparatus, the method comprising the steps of: connecting to data busses of both a robot controller and a welding timer via dual-port RAM; squeezing welded article between a pair of electrode tips; supplying a current to said welded article while applying a pressurizing force onto said electrode tips; editing arbitrary welding parameters including a welding time and a welding current and arbitrary parameters including said electrode pressurizing force through a teaching pendant of said robot controller, so that said edited data are stored into a RAM of said welding timer via said dual-port RAM; driving said electrode tips with said electrode pressurizing force by said robot controller when welding is to be started, giving a weld command to said welding timer via said dual-port RAM by said robot controller; starting to control a welding time by said welding timer; instructing, by said welding timer, to change said electrode pressurizing force to said robot controller via said dual-port RAM when said welding time is synchronized; and setting, by said robot controller, a predetermined value of said electrode pressurizing force in response to said instruction.

According to the third aspect of the invention, communication via an I/O unit or an interface based on serial communication is low in speed and involves a delay due to a noise filter or the like, and hence a delay is produced between a timing when the robot controller transmits the welding current changing signal, and that when the welding timer receives the signal. Therefore, the robot controller and the welding timer are coupled to each other by the dual-port RAM which is connected to data busses of the robot controller and the welding timer, whereby communication on the busses is enabled to enhance the speed of data communication.

In the forth aspect of the invention, a welding parameters setting method for resistance welder control apparatus, the method comprising the steps of: squeezing welded article between a pair of electrode tips; supplying a current to said welded article while applying a pressurizing force onto said electrode tips; controlling said pressurizing force by a robot controller; controlling a welding current by a welding timer; editing welding parameters including an arbitrary welding time and an arbitrary welding current and parameters including arbitrary electrode pressurizing force through a teaching pendant of said robot controller, so that said edited data are stored into a RAM of said robot controller; driving, by said robot controller, said electrode tips with said electrode pressurizing force; giving, by said robot controller, said welding current and a weld command to said welding timer; starting to control said welding current by said welding timer; instructing, by said robot controller, a change of said welding current to said welding timer at predetermined time; and switching to set, by said welding timer, a predetermined value of said welding current in response to said instruction.

According to the forth aspect of the invention, an arbitrary electrode pressurizing force is edited by the teaching pendant of the robot controller, the edited force is transferred to the welding timer and stored thereinto, and, at a given timing of changing the pressurization during a welding process, the welding timer instructs the robot controller on the electrode pressurizing force.

In the fifth aspect of the invention, a welding parameters setting method for resistance welder control apparatus, the method comprising the steps of: squeezing welded article between a pair of electrode tips; supplying a current to said welded article while applying a pressurizing force onto said electrode tips; connecting a robot controller and a welding timer by a dual-port RAM, which is connected to data busses of both said robot controller and said welding timer; editing arbitrary welding parameters and arbitrary parameters including said electrode pressurizing force through a teaching pendant of said robot controller, so that said edited parameters are stored into a RAM of said robot controller; driving said electrode tips with said electrode pressurizing force by said robot controller when welding is to be started; giving, by said robot controller, a welding command and said welding current to said welding timer via said dual-port RAM; instructing, by said robot controller, a change of said welding current to said welding timer via said dual-port RAM when said pressurizing force control are synchronized; and switching to set, by said welding timer, a predetermined value of said welding current in response to said instruction.

According to fifth aspect of the invention, Communication via an I/O unit or an interface based on serial communication is low in speed and involves a delay due to a noise filter or the like, and hence a delay is produced between a timing when the welding timer issues a pressurization changing signal, and that when the robot controller receives the signal. Therefore, the robot controller and the welding timer are coupled to each other by the dual-port RAM which is connected to data busses of the robot controller and the welding timer, whereby communication on the busses is enabled to enhance the speed of data communication.

DESCRIPTION OF THE PREFERRED EMBODIMENTS

Figure 4:
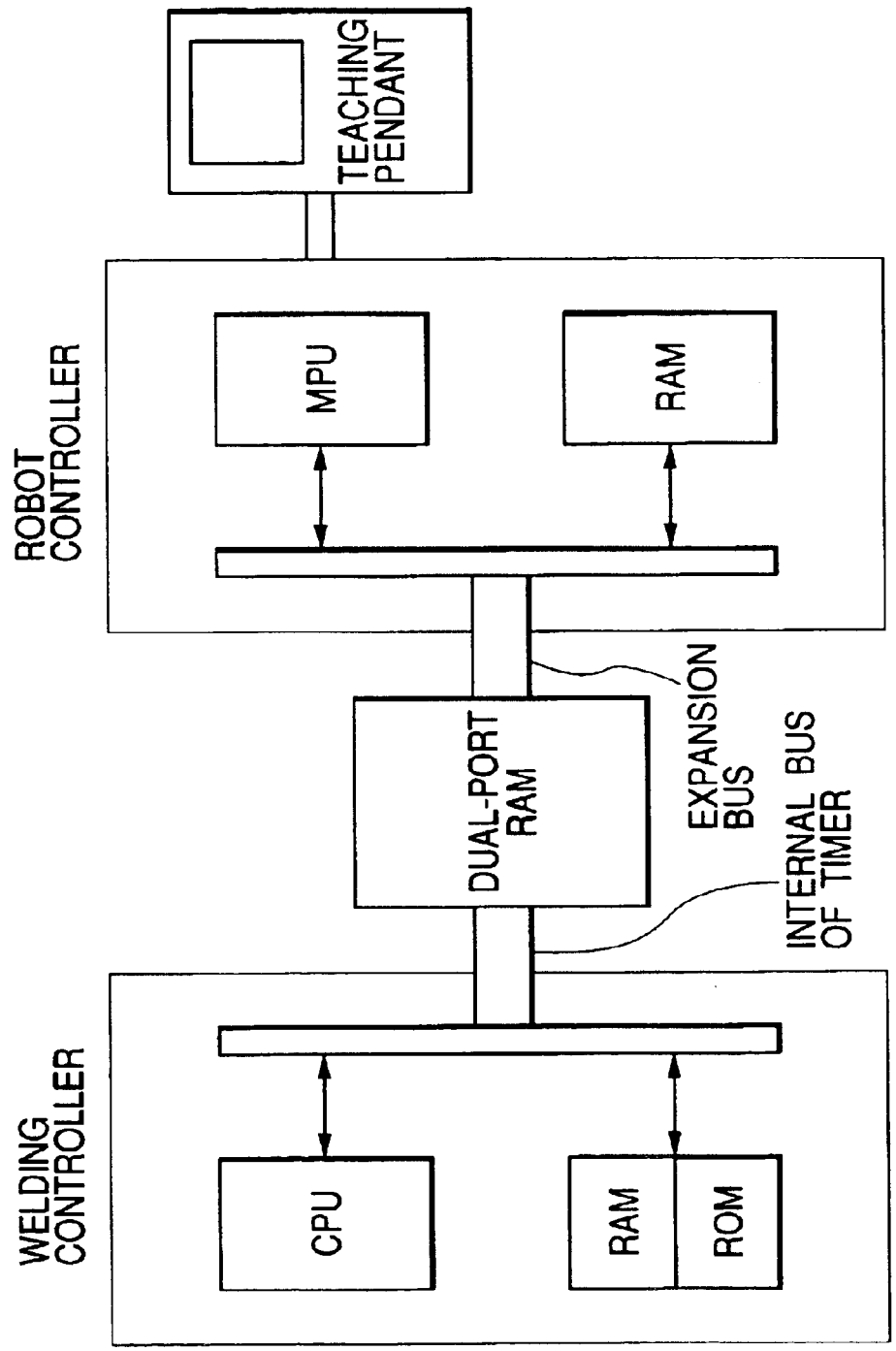
FIG. 4 a block diagram showing an example of a connection circuit for performing a method of setting welding parameters of first aspect of the invention.
Figure 5:
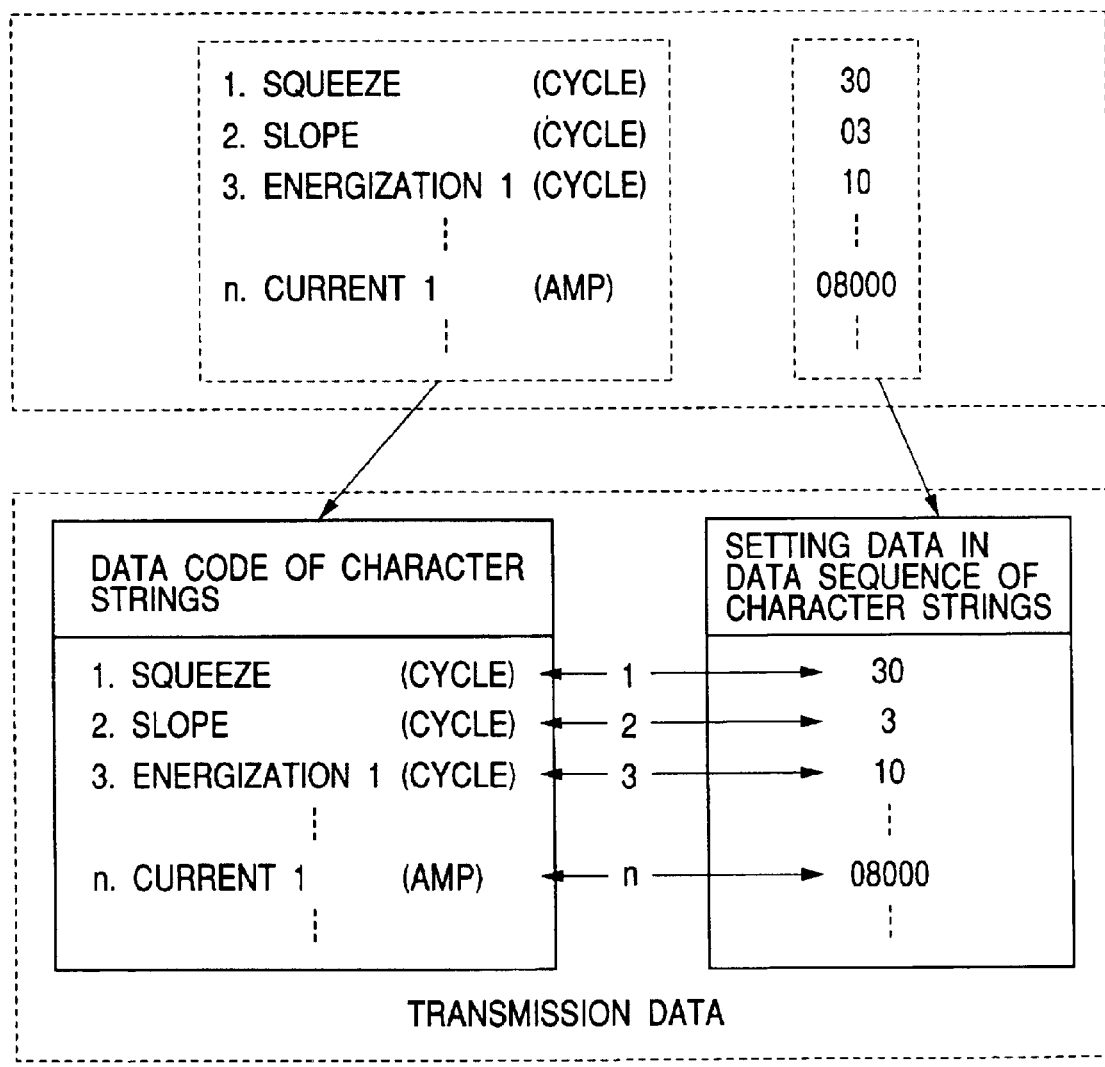
FIG. 5 is a view showing an example of a display for setting welding parameters according to first aspect the invention.

FIG. 4 is a block diagram showing an example of a connection circuit of a controller for a resistance welder according to the invention. FIG. 5 is a view showing an example of a display for setting welding parameters according to the invention.

Figure 1:
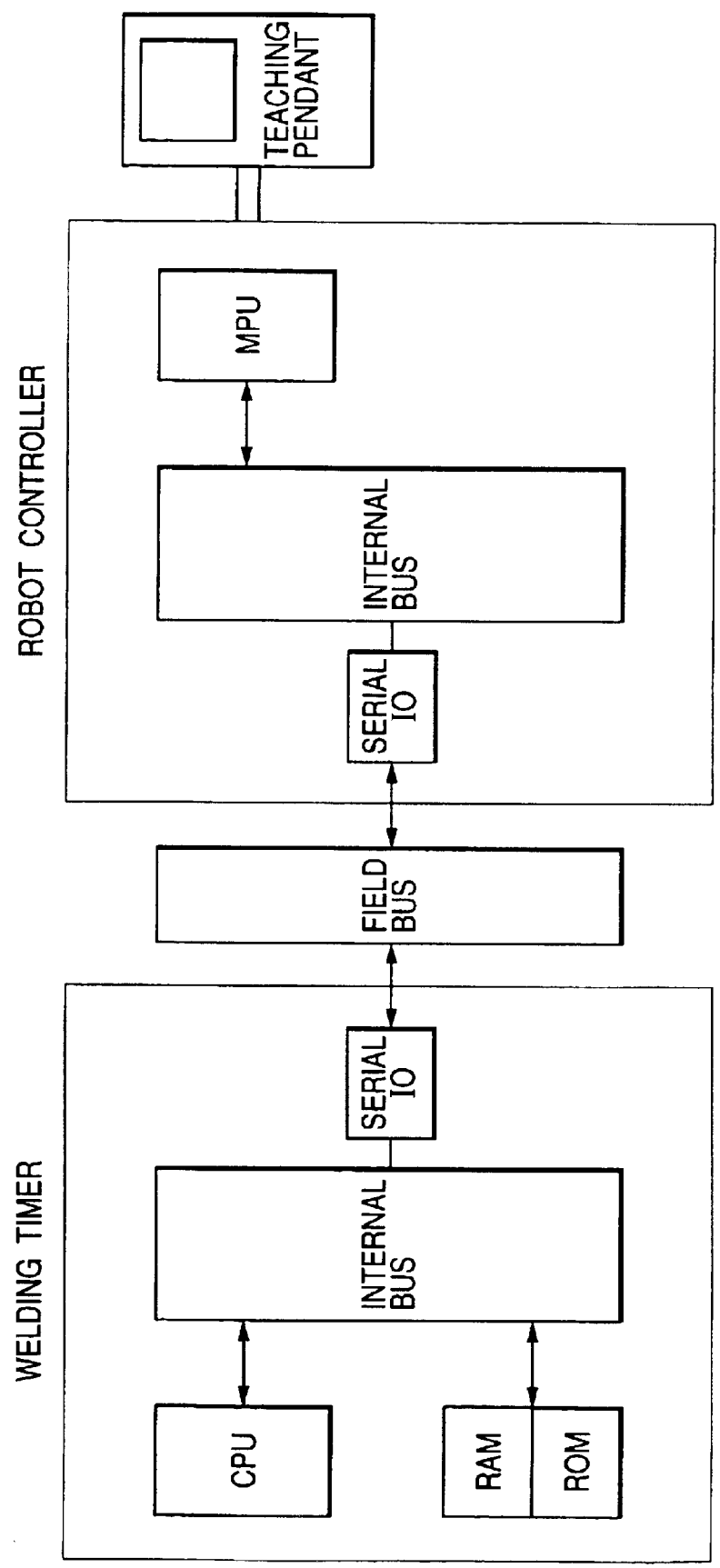
FIG. 1 is a block diagram showing an example of a method of teaching welding sequence data in the related art.
Figure 2:
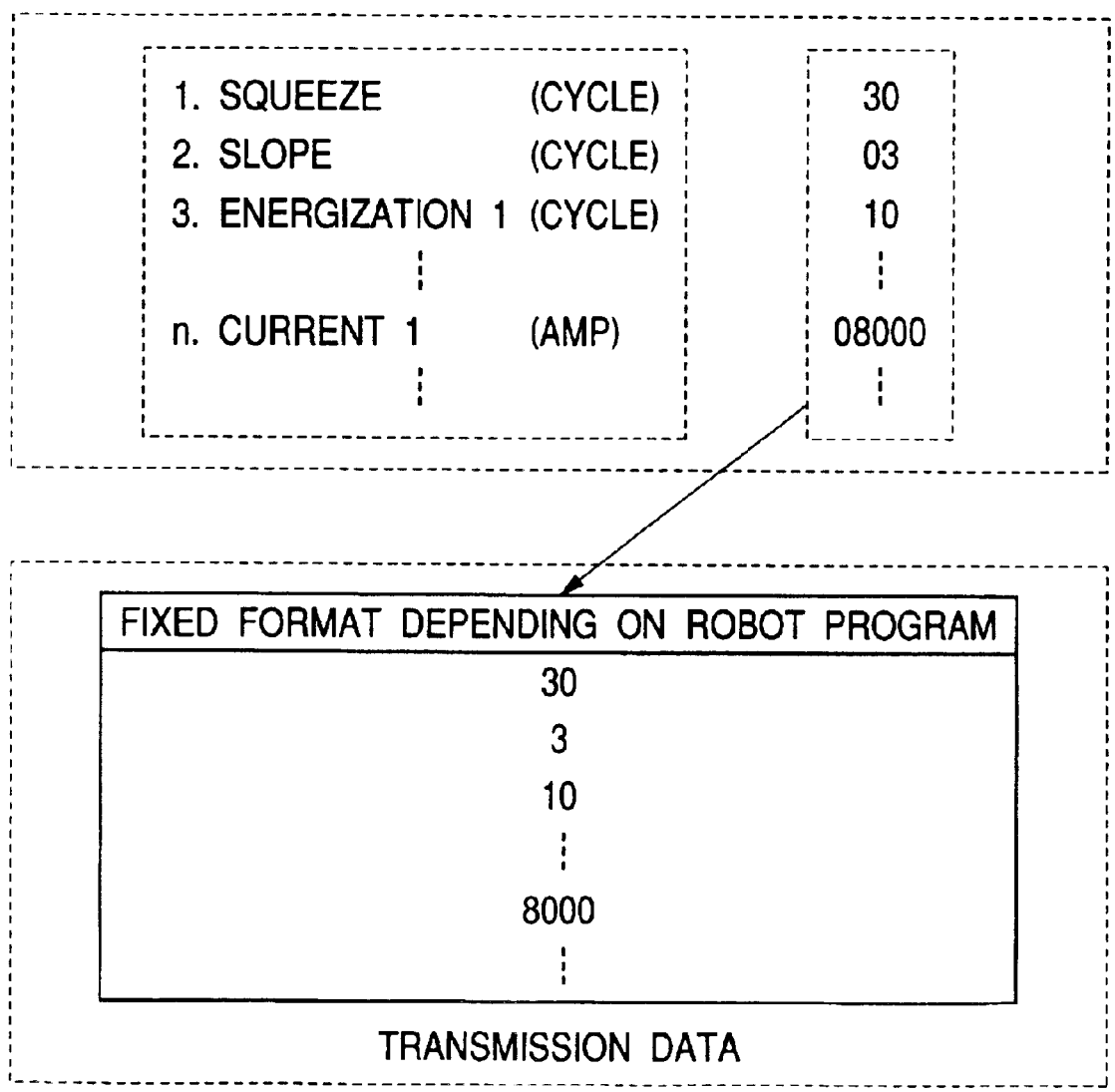
FIG. 2 is a view showing an example of a display for setting welding parameters in the related art.

Referring to FIG. 1, a welding timer time-controls mechanical and electrical operations by means of both sequence program and controller of a spot welder. The welding timer is incorporated together with a robot controller for a welding robot, into a main unit.

The welding timer and the robot controller are directly coupled to each other by a dual-port RAM with using internal buses of both the timer side and an expansion bus of the robot side.

The dual-port RAM is divided into a command area and a data area. When data are to be transmitted from the robot controller to the welding timer, arbitrary data to be transmitted are set into the data area, and thereafter a transmission command is set into the command area. The timer controller always polls (monitors) the command area. When the command of the robot controller is read, a process corresponding to the designated command is performed by the robot controller.

Figure 6:
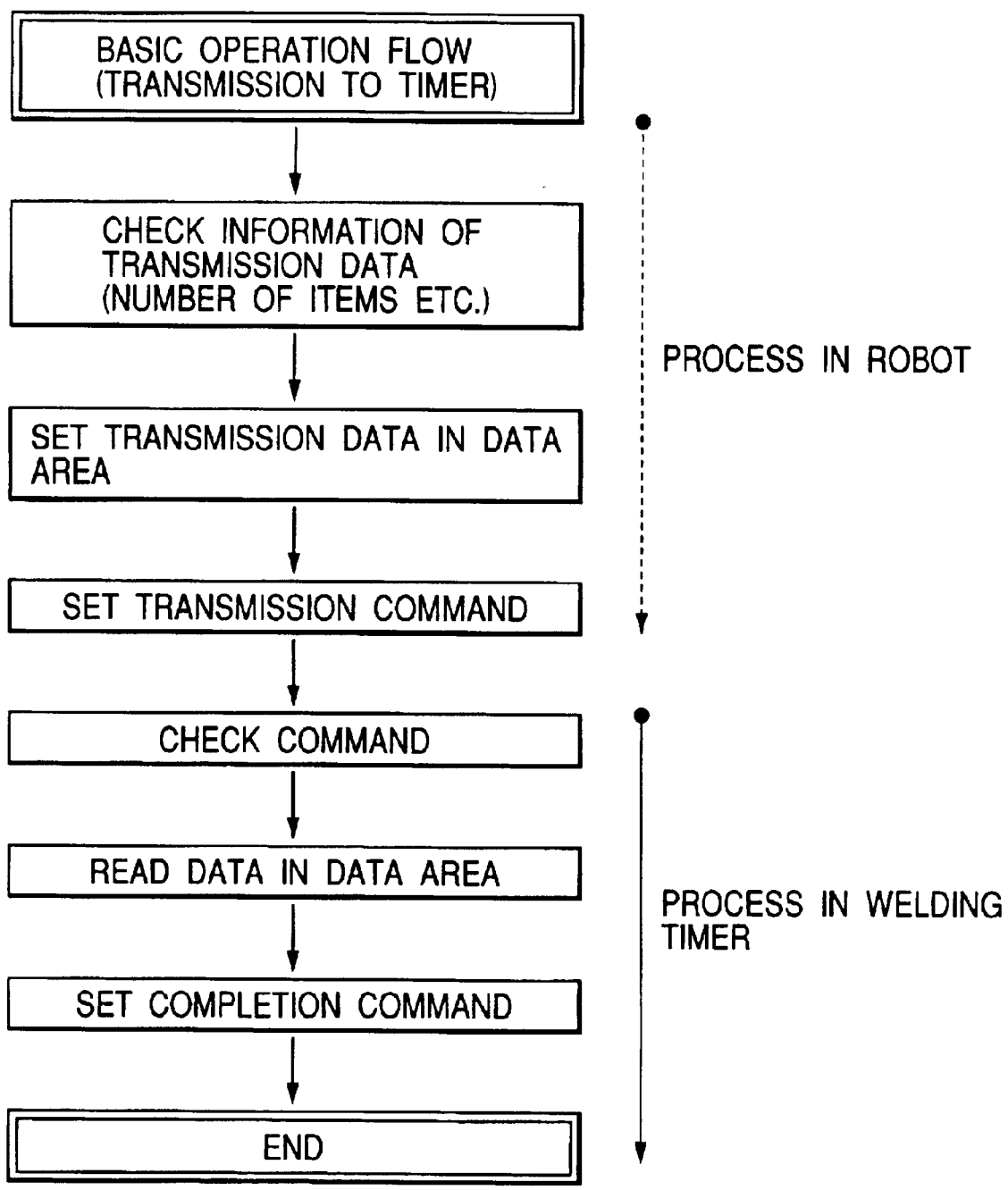
FIG. 6 is a flowchart of reading standard data in the method of setting welding parameters of first aspect the invention.

FIG. 6 shows a basic command flow in the invention.

In this case, when the timer controller similarly sets arbitrary data into the data area. Thereafter, the timer controller sets a command into the command area when the robot controller reads the command from the command area, a corresponding process is performed.

In the case where the welding timer is initially connected to the robot, in a first power on, the robot controller receives, from the welding timer, both character strings of items to be set and standard values of the parameters in the same arrangement sequence as the items to be set. Then, the character strings of items and the standard values of the parameters are stored into a backup RAM of the robot. At this time, the welding timer sets a number of effective items of welding condition data, into the data area of the dual-port RAM.

The robot controller can then read both the character strings of items and the parameter values in a proper number neither too much nor too little.

Figure 7:
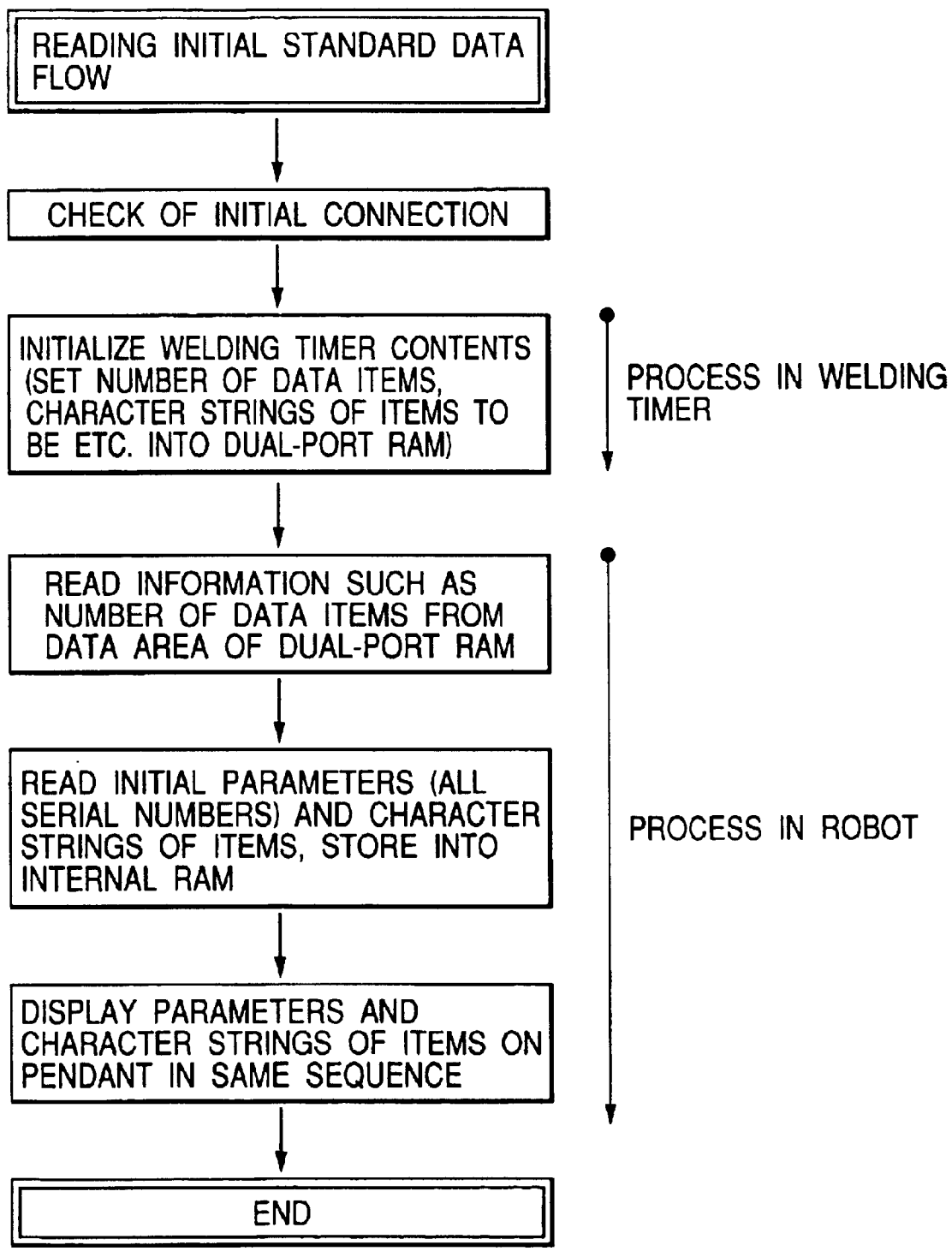
FIG. 7 is a flowchart of basic commands in the method of setting welding parameters of first aspect the invention.

FIG. 7 shows a flow of reading standard data. In this case, the robot controls the robot teaching pendant so as to display the data at the same time that the robot store stores the data into the backup RAM.

The character strings of items to be read such as "squeeze (cycle)", "slope (cycle)", "energization 1 (cycle)", and "current 1 (amp)", and the values of the welding parameters "30", "3", "10", . . . , "8000" are arranged in the same sequence of "1", "2", "3", . . . , "n".

As shown in FIG. 5, the robot controller displays the character strings of items and the values of the welding parameters on the teaching pendant of the robot in the same arrangement sequence. Accordingly, when a welding parameter of an arbitrary row is edited, the data corresponding to the character string of item of the row is edited. Therefore, the robot controller can edit the welding parameters respectively corresponding to the rows, without particularly recognizing the meaning of the data of each row.

After the initial connection, the robot controller transmits the parameters which are stored in the backup memory of the robot at the timing of the power-on, via the dual-port RAM. At this time, the robot controller reads character strings of items and the effective item number from the welding timer. Then, the robot controller controls the robot teaching pendant so as to display the character strings of items and the parameter values in the same arrangement sequence in accordance with the effective item number at the same time the robot controller transmits parameters to the welding timer in accordance with the effective item number.

When the item number of the welding timer is changed, the robot controller operates in the following manner. When the power source is turned on, the effective item number is set into the dual-port RAM. Therefore, the robot controller compares the item number with the data which are internally backed up. If the item number is different from the data, the robot controller reads both standard parameters and character strings of items, which are newly added from the welding timer via the dual-port RAM, and then the robot controller stores the data into the backup RAM of the robot. At the same time, the robot controller controls the teaching pendant so as to display the data in the same sequence. As a result, the robot controller can automatically cope with the change of the data.

Hereinafter, an embodiment of the invention will be described with reference to the accompanying drawings.

Figure 8:
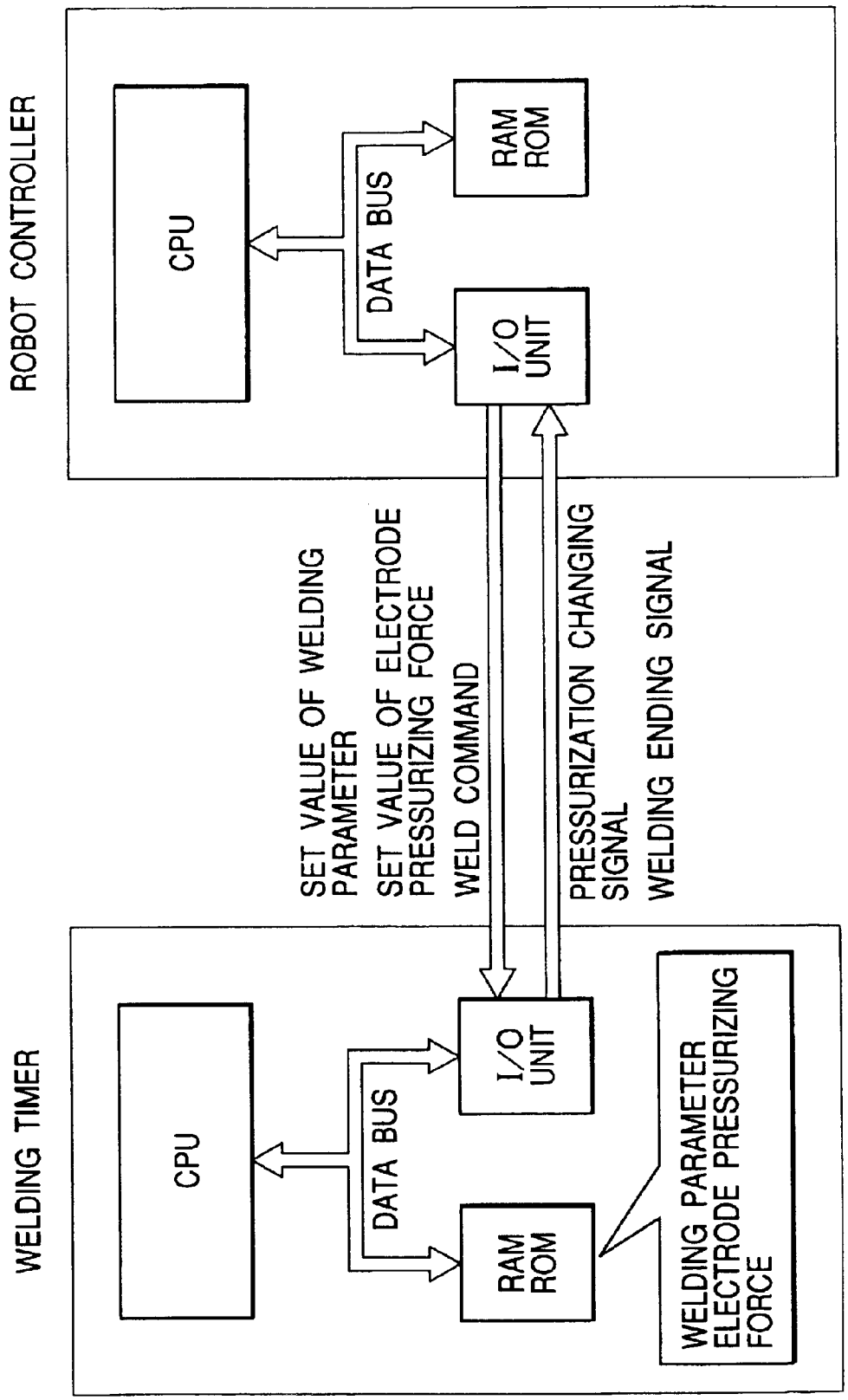
FIG. 8 is a block diagram showing an embodiment of the invention according to second aspect of the invention.
Figure 9:
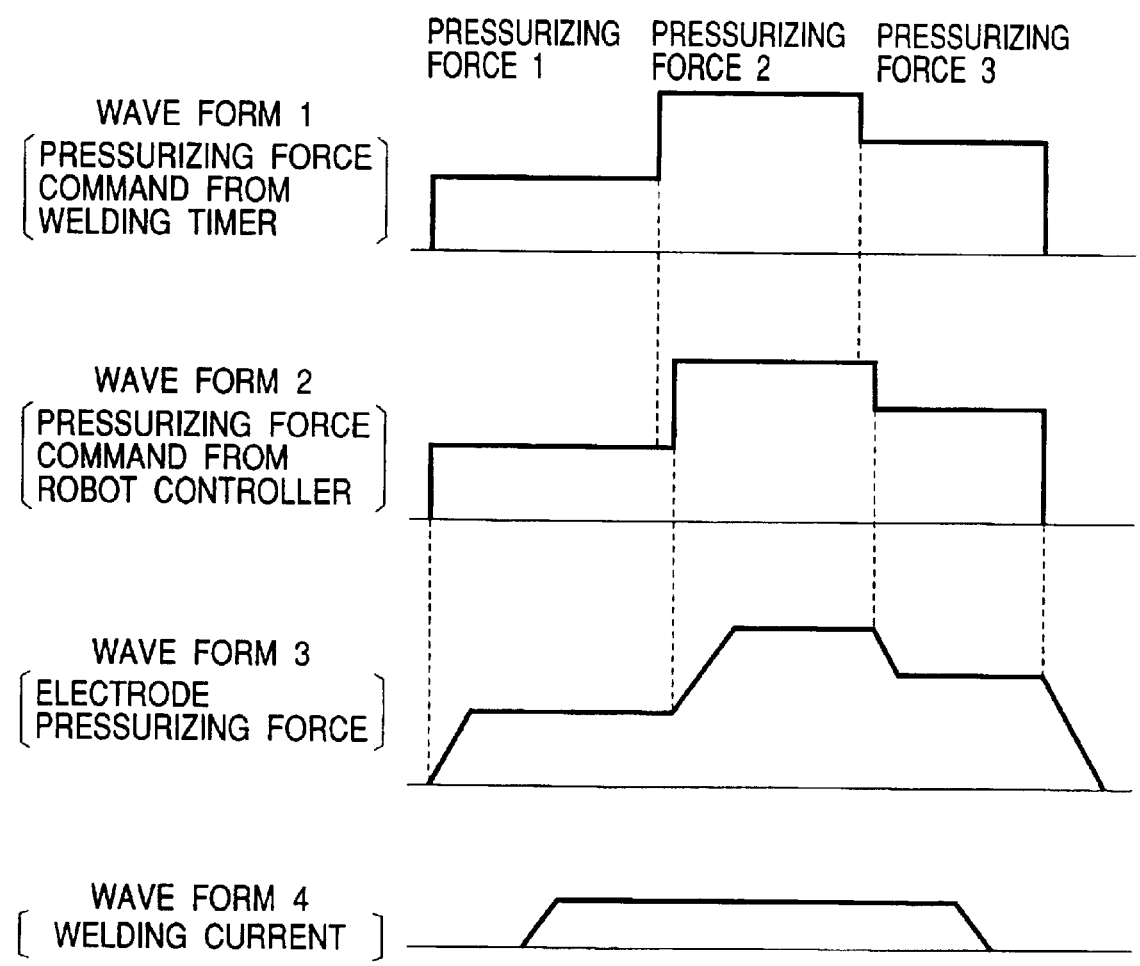
FIG. 9 is a sequence diagram showing an example of variable pressurization according to second aspect of the invention.
Figure 10:
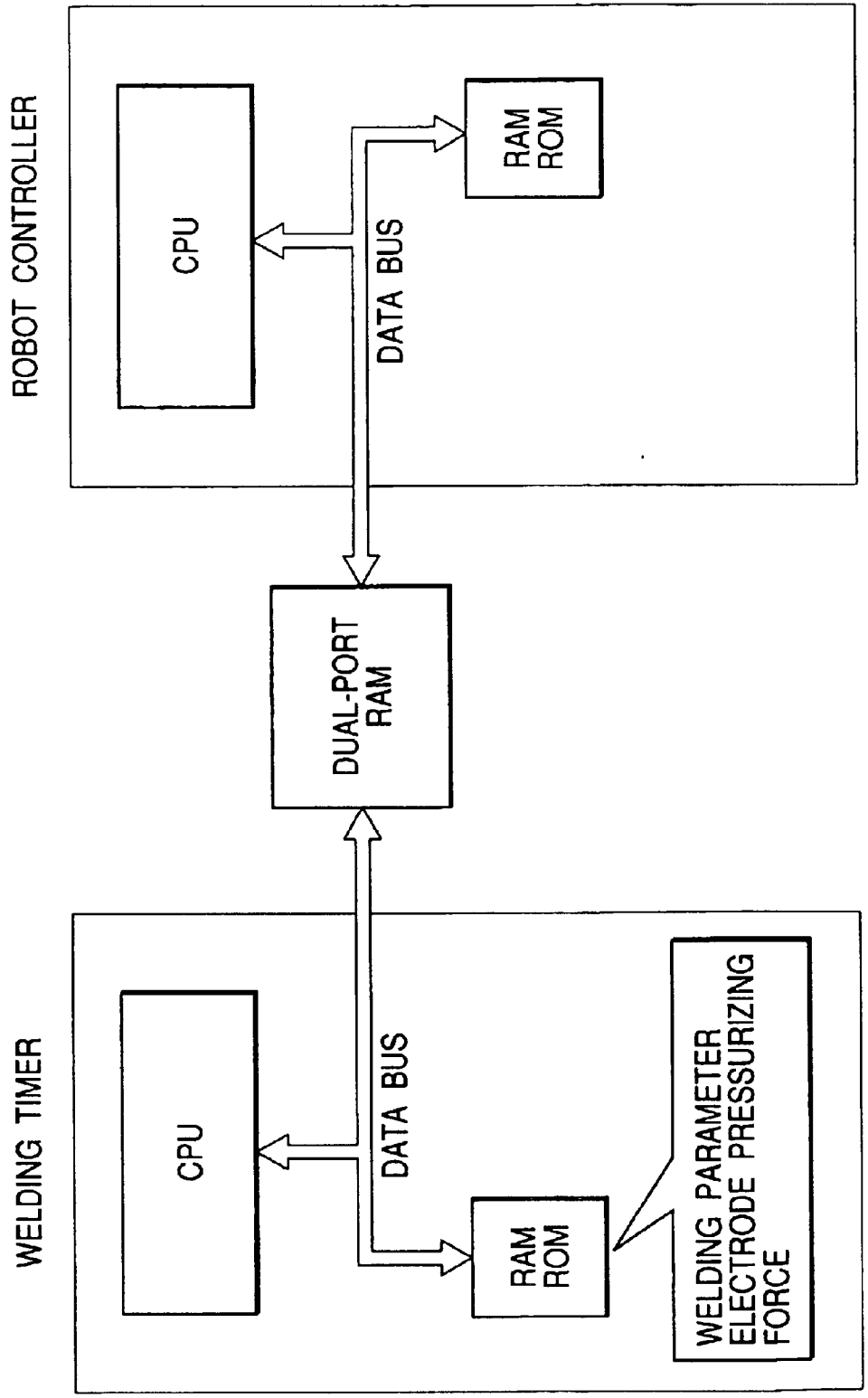
FIG. 10 is a block diagram showing an embodiment of the invention according to a third aspect of the invention.
Figure 11:
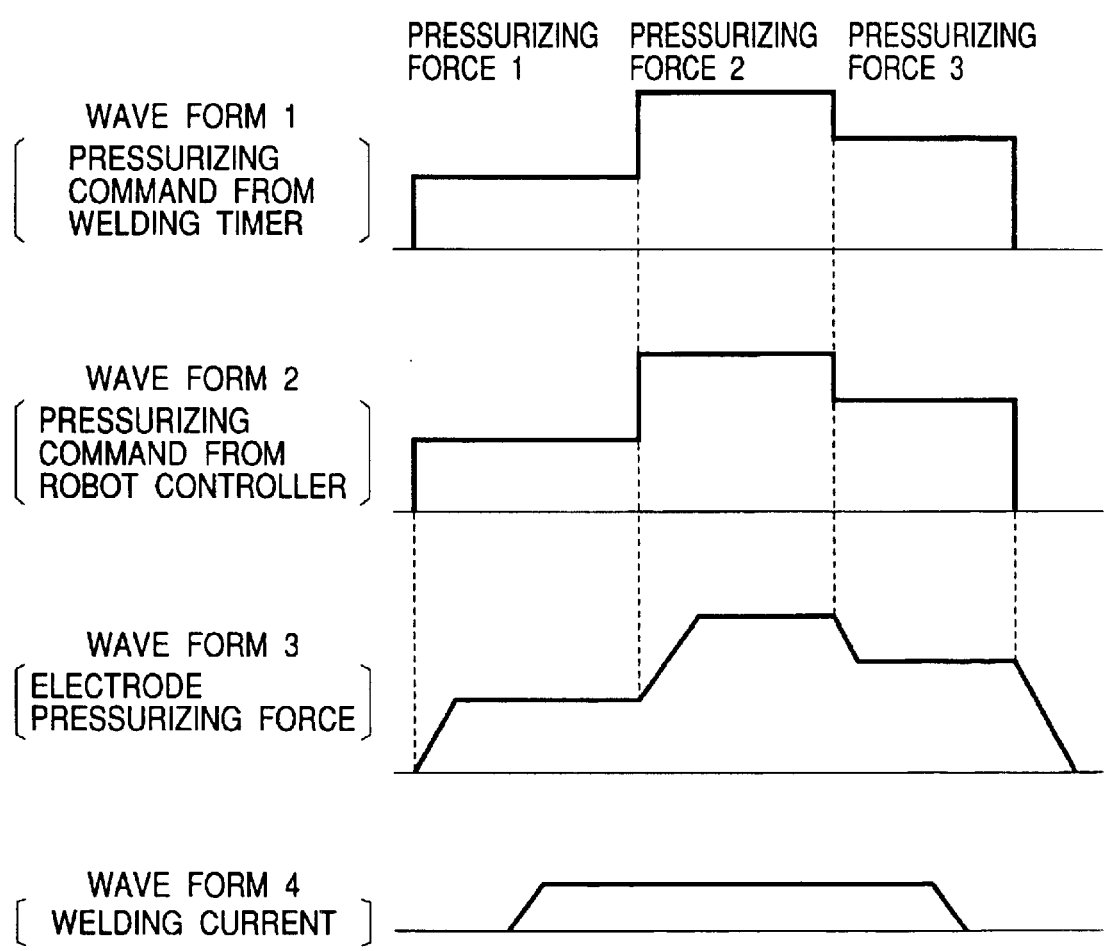
FIG. 11 is a sequence diagram showing an example of variable pressurization according to a third aspect of the invention.

FIG. 8 is a block diagram showing an embodiment of second aspect of the invention. FIG. 9 shows an example of a variable pressurization sequence according to second aspect of the invention. FIG. 10 is a block diagram showing an embodiment of third aspect of the invention. FIG. 11 shows an example of a variable pressurization sequence according to third aspect of the invention.

Referring to FIG. 8, a welding timer performs a welding control such as a welding current and a welding time. Although not shown in the figures, a resistance spot welder is mounted on a robot arm which can freely move in plural axial directions.

A servo motor drives a pressurizing axis to cause electrode tips of the spot welder to perform both the electrode pressurizing and the electrode opening operations, which are required for welding. A robot controller controls the servo motor for the pressurizing axis.

Welding parameters such as an arbitrary welding time and an arbitrary welding current, and an arbitrary electrode pressurizing force and the like are edited by a teaching pendant of the robot controller. The edited data are transferred to a RAM of the welding timer via an I/O unit or an interface based on serial communication to be stored thereinto.

Thereafter, the robot controller gives a weld command to the welding timer. The welding timer performs a welding process based on the weld command.

The time control such as the welding time of the welding parameters is performed by a time counter in the welding timer. The welding current is controlled by the welding timer itself with using a switching element such as a thyristor connected to the welding timer.

The robot controller performs a servo control on the pressurizing axis. Therefore, with respect to the electrode pressurizing force, the welding timer instructs the robot controller on an arbitrary preset electrode pressurizing force, while a welding sequence is performed. Accordingly, the robot controller controls the servo motor for the pressurizing axis in response to the instructions of the electrode pressurizing force, so that a predetermined electrode pressurizing force is realized.

FIG. 10 is a block diagram of the embodiment of third aspect of the invention.

In the welding control according to second aspect of the invention as shown in FIG. 9, a delay, which is generated in communication via an I/O unit or an interface based on serial communication, causes both a delay generated between a timing (waveform 1) of the pressurizing force command of the welding timer and a timing (waveform 2) of the pressurizing force command of the robot controller, so that the actual electrode pressurization (waveform 3) is delayed.

Therefore, communication via an I/O unit or an interface based on serial communication may be replaced with a communication via a dual-port RAM. The welding timer and the robot controller are coupled to each other by the dual-port RAM, which is connected to data busses of both the welding timer and the robot controller. Then, arbitrary welding parameters, an arbitrary electrode pressurizing force, and the like are edited by the teaching pendant of the robot controller. The edited data are transferred to a RAM of the welding timer via the dual-port RAM.

Thereafter, the robot controller gives the weld command to the welding timer via the dual-port RAM. The welding timer performs a welding process based on the weld command. The welding timer instructs the robot controller on an arbitrary preset electrode pressurizing force at an arbitrary preset timing during the progress of a welding sequence, via the dual-port RAM. In response to the instructions of the electrode pressurizing force, the robot controller switches the predetermined electrode pressurizing force.

FIG. 11 shows an example of the variable pressurization sequence according to third aspect of the invention. Since the data busses are connected to each other via the dual-port RAM as shown in FIG. 11, the speed of the data communication can be enhanced, so that the electrode pressurizing force can be switched to the predetermined force at a given timing synchronized with the progress of the welding time.

Figure 12:
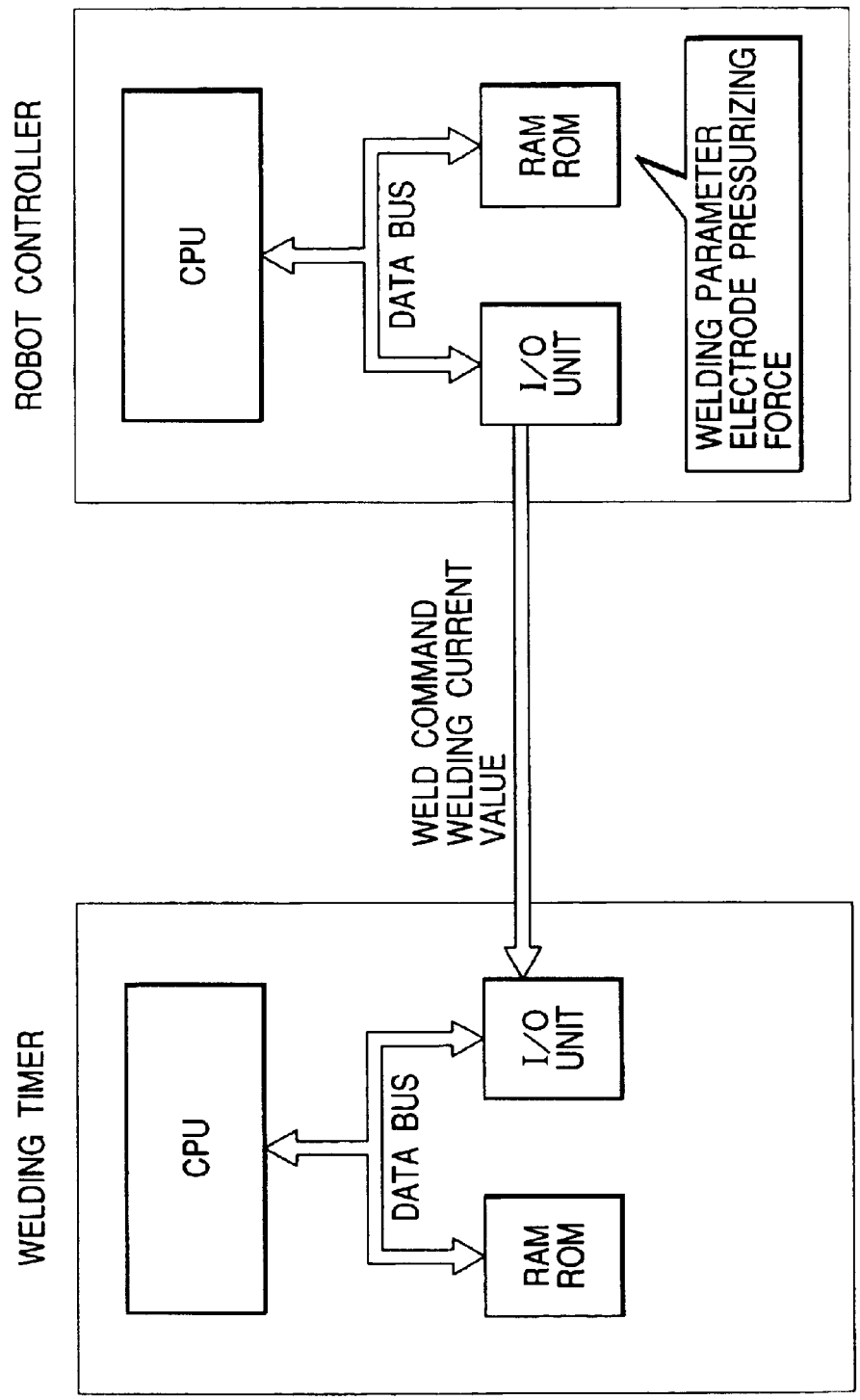
FIG. 12 is a block diagram showing an embodiment of the invention according to forth aspect of the invention.
Figure 13:
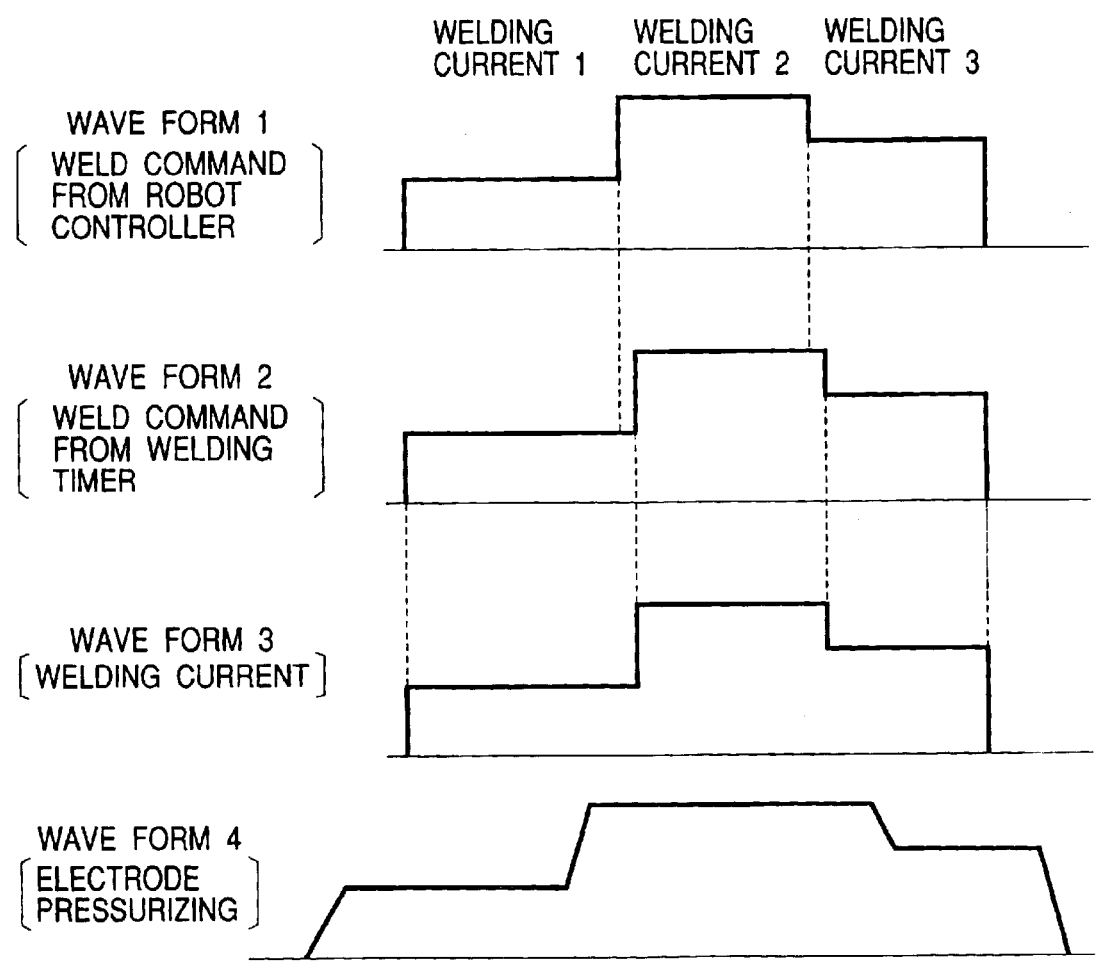
FIG. 13 is a sequence diagram showing the embodiment according to forth aspect of the invention.
Figure 14:
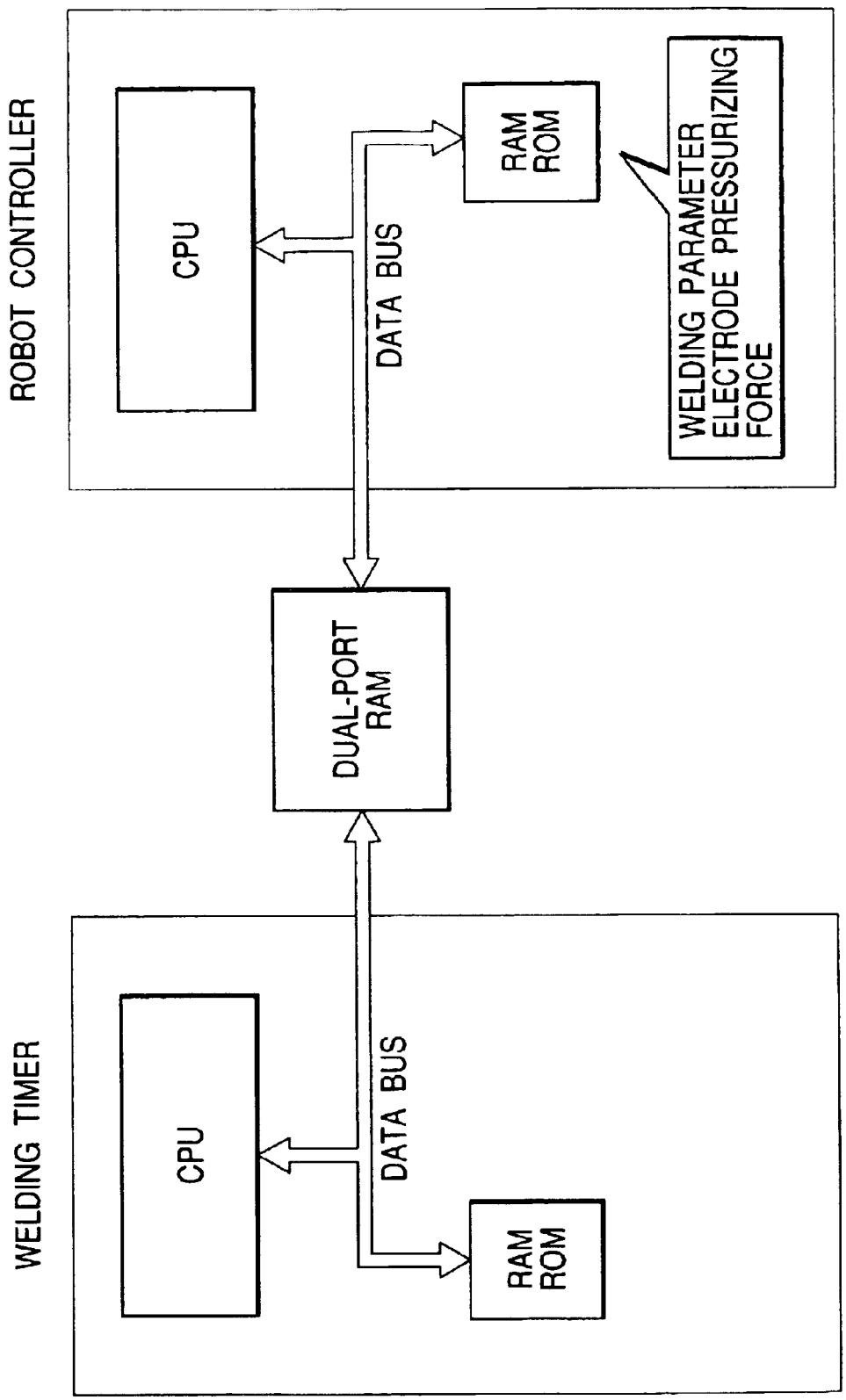
FIG. 14 is a block diagram showing an embodiment of the invention according to fifth aspect of the invention.
Figure 15:
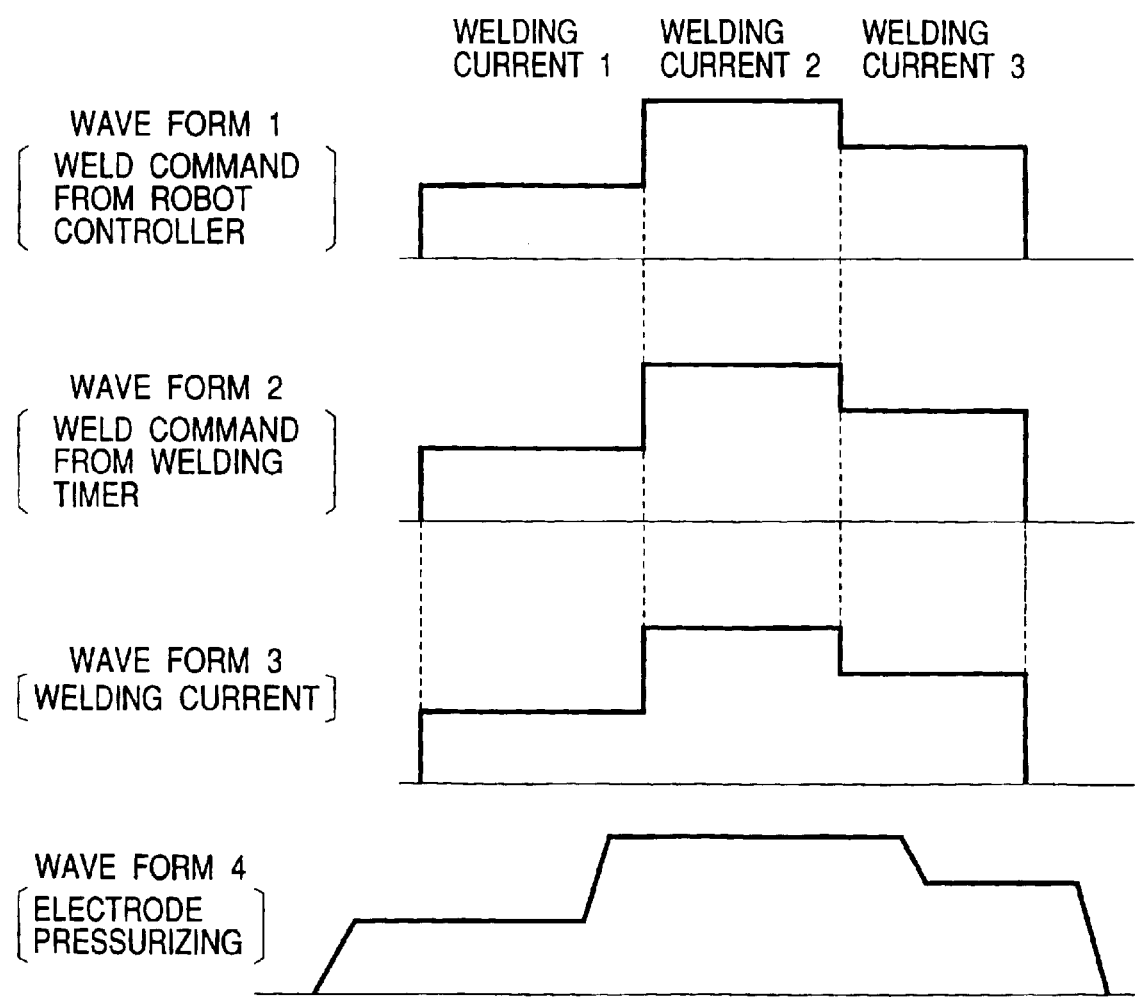
FIG. 15 is a sequence diagram showing the embodiment example according to fifth aspect of the invention.

Hereinafter, an embodiment of the invention will be described with reference to the accompanying drawings. FIG. 12 is a block diagram showing an embodiment of forth aspect of the invention. FIG. 13 is a sequence diagram of the embodiment of forth aspect of the invention. FIG. 14 is a block diagram showing an embodiment of fifth aspect of the invention. FIG. 15 is a sequence diagram of the embodiment of fifth aspect of the invention.

Referring to FIG. 12, a welding timer performs a welding control. Although not shown in the figures, a resistance spot welder is mounted on a robot arm which can freely move in plural axial directions. A servo motor drives a pressurizing axis to cause electrode tips of the spot welder to perform pressurizing and opening operations which are required for welding. A robot controller controls the servo motor for the pressurizing axis.

Welding parameters such as an arbitrary welding time and an arbitrary welding current, and an arbitrary electrode pressurizing force and the like are edited by a teaching pendant of the robot controller. The edited data are transferred to a RAM of the welding timer via an I/O unit or an interface based on serial communication to be stored thereinto.

Thereafter, the robot controller gives both the value of the welding current and a weld command to the welding timer.

The welding timer performs a welding process based on the weld command.

The time control such as the welding time and the pressurizing force switching timing is performed by the welding timer with using a time counter in the robot controller. The welding current is controlled by the welding timer with using a switching element such as a thyristor connected to the welding timer. With respect to the electrode pressurizing force, the robot controller performs a servo control on the pressurizing axis.

The robot controller instructs the welding timer on an arbitrary preset value of the welding current at a given timing synchronized with progress of the pressurization control. In response to the instructions of switching the welding current, the welding timer controls the switching element to realize a predetermined welding current.

Figure 3:
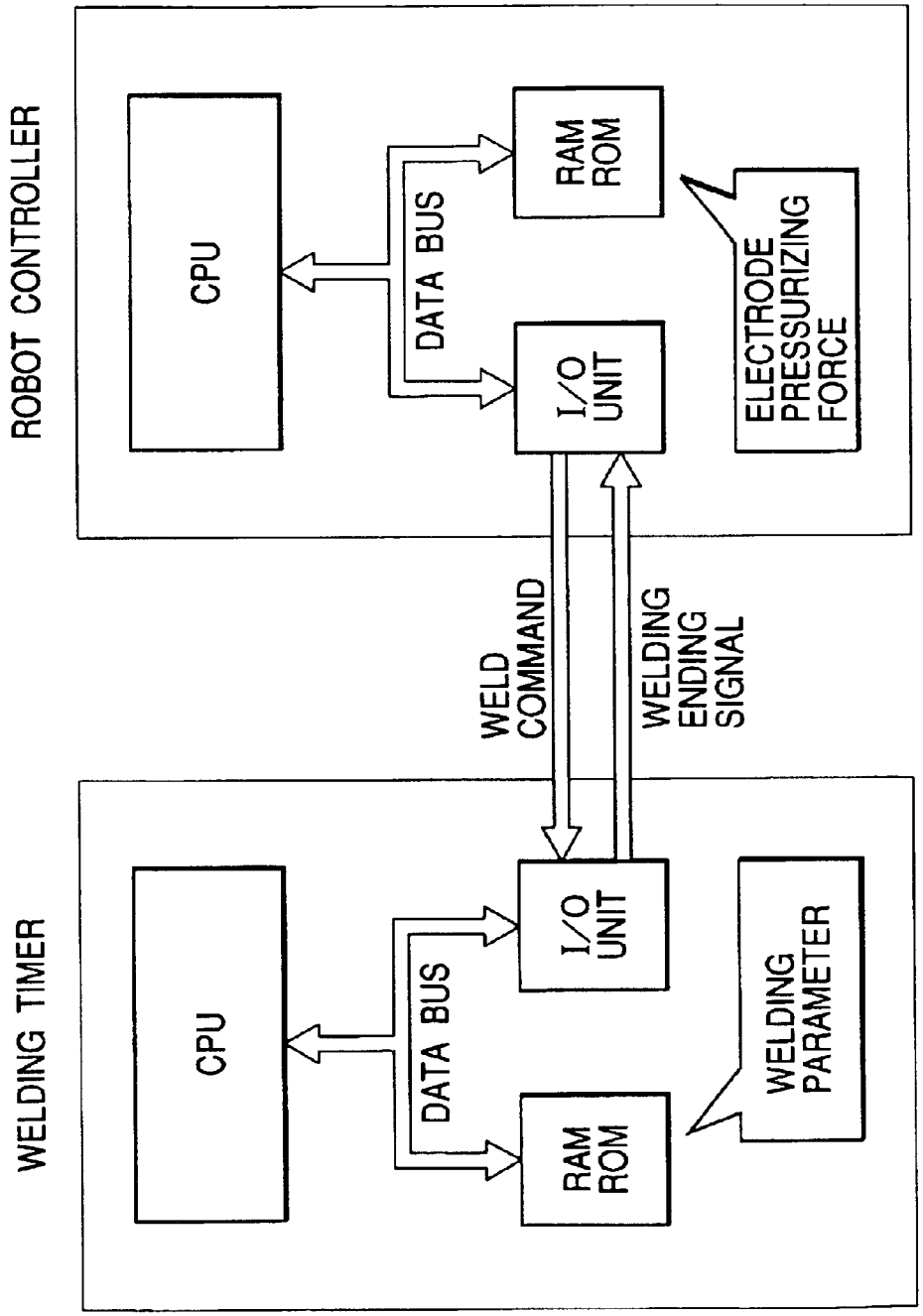
FIG. 3 is a block diagram showing coupling relationships between a welding timer and a robot controller in the related art.

FIG. 14 is a block diagram of the embodiment of fifth aspect of the invention. In the welding control according to forth aspect of the invention, as shown in FIG. 3, a delay, which is generated in communication via an I/O unit or an interface based on serial communication, causes both delay between a timing (waveform 1) of the weld command of the robot controller and a timing (waveform 2) of the weld command of the welding timer, so that the actual changing of the welding current (waveform 3) is delayed.

Therefore, communication via an I/O unit or an interface based on serial communication is replaced with communication via the dual-port RAM. The welding timer and the robot controller are coupled to each other by the dual-port RAM, which is connected to data busses of the welding timer and the robot controller.

Arbitrary welding parameters, an arbitrary electrode pressurizing force, and the like are edited by the teaching pendant of the robot controller. The edited data are stored into the RAM of the robot controller.

Thereafter, the robot controller gives the weld command to the welding timer via the dual-port RAM. Then, the welding timer starts a welding process on the basis of the weld command. The robot controller instructs, via the dual-port RAM, the welding timer on an arbitrary preset value of the welding current at an arbitrary preset timing, while the pressurization control is progressed. In response to the instructions, the welding timer switches the predetermined value of the welding current.

FIG. 15 shows the embodiment of the variable pressurization sequence according to fifth aspect of the invention. Since the data busses are connected to each other via the dual-port RAM as shown in FIG. 15, the speed of the data communication can be enhanced, so that the welding current can be changed to the predetermined value at a given timing synchronized with the progress of the pressurization control.

According to the first aspect of the invention, in a robot welding integrated timer in which a robot controller and a welding timer are coupled to each other by a dual-port RAM connected to data busses of the robot controller and the welding timer, even when, in order to change the function of the welding timer, control software is modified so that new welding parameters are added or the contents of the items are changed, the correspondence relationships between character strings of items of the welding parameters and the arrangement sequence of the welding parameters are always maintained. According to the configuration, the function of the welding timer can be freely changed without causing any change in software of a teaching pendant of a robot. Therefore, the cost can be reduced.

As described above, according to second aspect of the invention, an excellent effect can be achieved that an arbitrary electrode pressurizing force and an arbitrary timing of changing the pressurizing force are set in the robot controller, the welding timer instructs the robot controller on an arbitrary electrode pressurizing force at an arbitrary timing during a welding process while synchronizing with the time control of the welding process, the robot controller receives the instructions of the electrode pressurizing force, and the electrode pressurizing force can be controlled so as to be changed during a certain spot welding process.

According third aspect of the invention, since the robot controller and the welding timer are coupled to each other by the dual-port RAM which is connected to data busses of the robot controller and the welding timer, to enable communication on the busses, the speed of data communication can be increased so that the electrode pressurizing force can be changed to a predetermined one at a given timing which is synchronized with the progress of the welding time.

As described above, according to forth aspect of the invention, an excellent effect can be achieved that an arbitrary electrode pressurizing force and arbitrary welding parameters are set in the robot controller, the robot controller instructs, via the dual-port RAM, the welding timer on a switching of the welding current at an arbitrary timing synchronized with the progress of the pressurization control, and, in response to the instructions, the welding timer can perform the control of changing the value of the welding current to a predetermined one.

According to fifth aspect of the invention, since the robot controller and the welding timer are coupled to each other by the dual-port RAM which is connected to data busses of the robot controller and the welding timer, to enable communication on the busses, the speed of data communication can be increased so that the welding current can be changed to a predetermined value at a given timing which is synchronized with the progress of the pressurization control.

The above-described embodiments show only part of the invention. The inventive concept of the invention is not limited to the embodiments of a resistance spot welder. It is a matter of course that the invention can be easily applied on the basis of the spirit of the invention to data communication in a seam welder, a projection welder, an upset welding machine, and other machines belonging to such welders.

What is claimed is:

1. A welding parameters setting method for resistance welder control apparatus, the method comprising the steps of:

connecting to data busses of both a robot controller and a welding timer via dual-port RAM;

storing, in ROM of welding timer, character strings of items of welding parameters for displaying on a teaching pendant of a robot and initial reference values of said welding parameters in a same sequence and in corresponding manner;

initially connecting said robot and said welding timer to each other;

transferring said character strings of items and standard parameters from said welding timer to said robot to be stored in RAM of said robot when power source is turned on;

displaying, on said teaching pendant, said character strings of items of said welding parameters and welding parameters values in same sequence and in a corresponding manner;

arbitrarily changing, in said teaching pendant of said robot, said welding parameters values of any schedule in accordance with welding conditions of a welded article to which said schedule is to be applied;

storing, in said RAM of said robot, said welding parameters values of any schedule;

transferring said welding parameters values of any schedule to a RAM of said welding timer to be stored thereinto via dual-port RAM; and transferring, a weld command from said robot to said welding timer via said dual-port RAM so that said welding timer performs a welding process based on said welding parameters which have been edited by said teaching pendant of said robot and which are stored in said RAM of said welding timer.

2. A welding parameters setting method for resistance welder control apparatus, the method comprising the steps of:

squeezing welded article between a pair of electrode tips;

supplying a current to said welded article while applying a pressurizing force onto said electrode tips;

controlling said pressurization of said electrode tips by a robot controller;

controlling a welding time and welding current by a welding timer;

editing welding parameters including an arbitrary welding time and an arbitrary welding current and parameters including arbitrary electrode pressurizing force through a teaching pendant of said robot controller, so that said edited data are stored into a RAM of said welding timer;

driving said electrode tips with said electrode pressurizing force by said robot controller when welding is to be started, giving a weld command to said welding timer by said robot controller;

starting to control said welding timer and welding current by said welding timer;

instructing, by said welding timer, change of said pressurizing force to said robot controller at predetermined time;

changing, by said robot controller, said pressurizing to a predetermined value in response to said instruction.

3. A welding parameters setting method for resistance welder control apparatus, the method comprising the steps of:

connecting to data busses of both a robot controller and a welding timer via dual-port RAM;

squeezing welded article between a pair of electrode tips;

supplying a current to said welded article while applying a pressurizing force onto said electrode tips;

editing arbitrary welding parameters including a welding time and a welding current and arbitrary parameters including said electrode pressurizing force through a teaching pendant of said robot controller, so that said edited data are stored into a RAM of said welding timer via said dual-port RAM;

driving said electrode tips with said electrode pressurizing force by said robot controller when welding is to be started, giving a weld command to said welding timer via said dual-port RAM by said robot controller;

starting to control a welding time by said welding timer;

instructing, by said welding timer, to change said electrode pressurizing force to said robot controller via said dual-port RAM when said welding time is synchronized; and setting, by said robot controller, a predetermined value of said electrode pressurizing force in response to said instruction.

4. A welding parameters setting method for resistance welder control apparatus, the method comprising the steps of:

squeezing welded article between a pair of electrode tips;

supplying a current to said welded article while applying a pressurizing force onto said electrode tips;

controlling said pressurizing force by a robot controller;

controlling a welding current by a welding timer;

editing welding parameters including an arbitrary welding time and an arbitrary welding current and parameters including arbitrary electrode pressurizing force through a teaching pendant of said robot controller, so that said edited data are stored into a RAM of said robot controller;

driving, by said robot controller, said electrode tips with said electrode pressurizing force;

giving, by said robot controller, said welding current and a weld command to said welding timer;

starting to control said welding current by said welding timer;

instructing, by said robot controller, a change of said welding current to said welding timer at predetermined time; and switching to set, by said welding timer, a predetermined value of said welding current in response to said instruction.

5. A welding parameters setting method for resistance welder control apparatus, the method comprising the steps of:

squeezing welded article between a pair of electrode tips;

supplying a current to said welded article while applying a pressurizing force onto said electrode tips;

connecting a robot controller and a welding timer by a dual-port RAM, which is connected to data busses of both said robot controller and said welding timer;

editing arbitrary welding parameters and arbitrary parameters including said electrode pressurizing force through a teaching pendant of said robot controller, so that said edited parameters are stored into a RAM of said robot controller;

driving said electrode tips with said electrode pressurizing force by said robot controller when welding is to be started, giving, by said robot controller, a welding command and said welding current to said welding timer via said dual-port RAM;

instructing, by said robot controller, a change of said welding current to said welding timer via said dual-port RAM when said pressurizing force control are synchronized; and switching to set, by said welding timer, a predetermined value of said welding current in response to said instruction.

* * * * *